Dec. 14, 1937.   G. H. FRASER   2,101,845
SPEED REDUCER AND OTHER TRANSMISSION
Filed Aug. 9, 1935
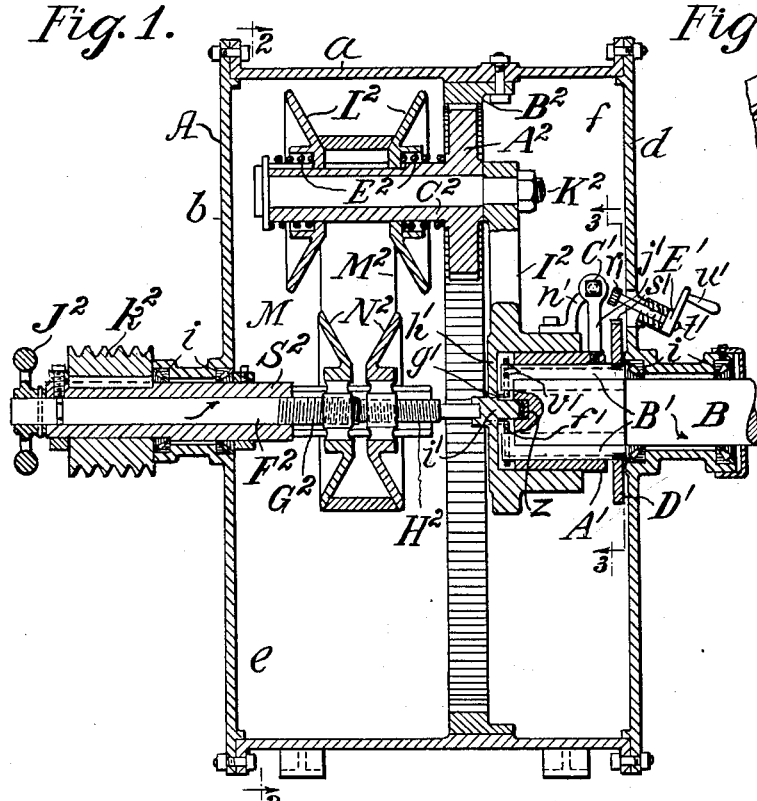
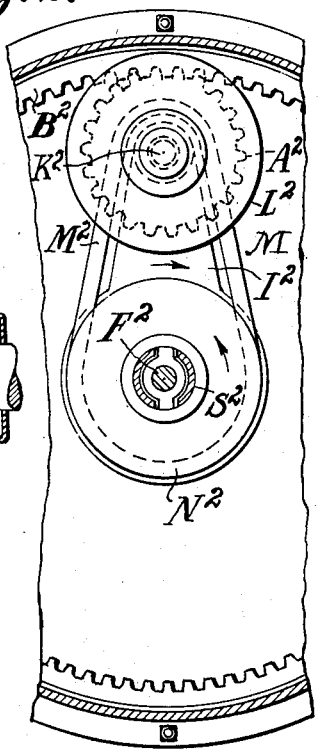
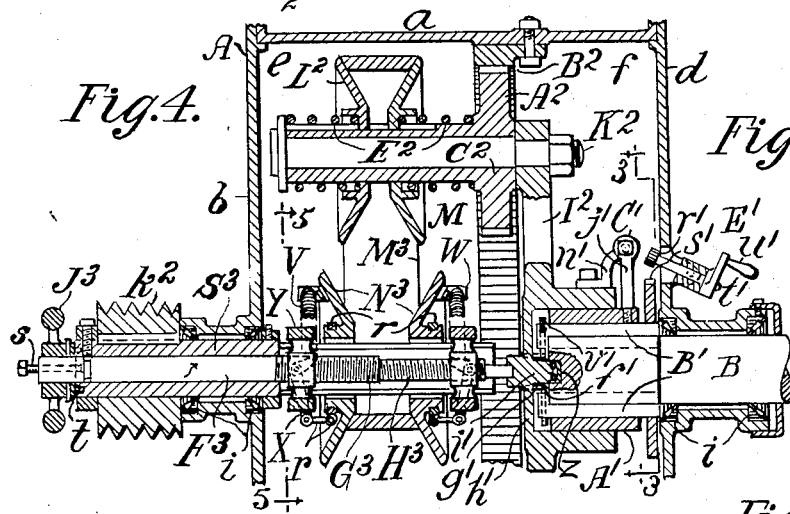
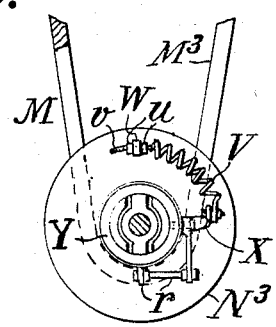
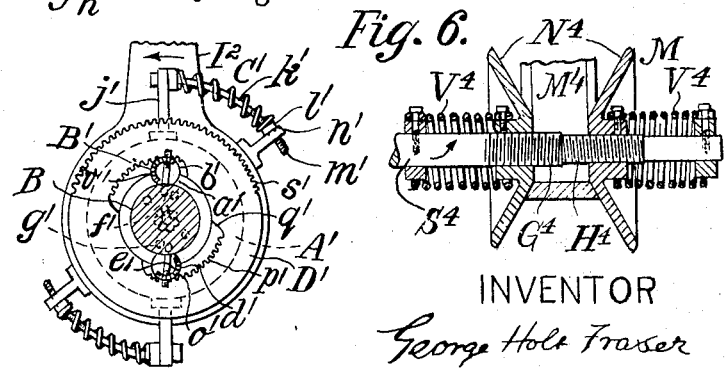
INVENTOR
George Holt Fraser Patented Dec. 14, 1937

2,101,845

UNITED STATES PATENT OFFICE 2,101,845

SPEED REDUCER AND OTHER TRANSMISSION

George Holt Fraser, Brooklyn, N. Y.

Application August 9, 1935, Serial No. 35,501

20 Claims. (Cl. 74—280)

This invention relates to speed reducers and other devices for varying and transmitting rotary motion, and aims to provide certain improvements therein.

This application is a continuation-in-part of application #631,853 filed Sept. 6, 1932.

It relates especially to speed change transmissions such as variable speed drives or speed change devices for varying the speed ratio between a drive and a driven shaft, and it especially relates to such drives which utilize torsionally yieldable or torque responsive continued torque and rotation transmission means for varying such speed ratio when continuously transmitting rotation from one member to another, and my invention especially aims to provide such devices with torque responsive torque or rotation termination means for torque responsive drive disconnection of the variable speed means from one of its shafts when torque becomes excessive, and to provide improved means for torque variation of the speed ratio with variations in torque.

Heretofore, variable speed transmissions have comprised revoluble rotatable and oscillatory planetary rollers, revoluble about an axis of concave annular tracks, rotatable about and around an axis radially of such axis, and oscillatory on an axis at right angles to such radial axis, for varying their speed of rotation; or they comprised two pairs of reversely axially movable conical pulleys tractionally engaging a V shaped belt the radius of which varied with their axial variation; or they have comprised reverse cone pulleys on parallel axes, and an axially shiftable belt which was shiftable for transmitting rotation from one to the other at variable speed ratios, or they have comprised a disc and radially or axially shiftable pulley in tractional engagement therewith; which devices have included manually operable ratio adjustment means, and torsionally yieldable or torque responsive continued torque and rotation transmission means, for torque responsively varying said ratios.

My invention aims to provide for torsional drive disconnection between such devices and one of their shafts upon overload of the latter, and improved means for cushioning torque therebetween during variations in normal torque load, and improved means for varying the speed ratio with variations of torque, and improved means for torsionally reducing the ratio during starting torque and for automatically restoring it coincidently with the attainment of the normal torque incident to normal drive, for thereby eliminating excessive maximum demand incident to starting drive, and for gradually accelerating the drive when it is started.

To this end in carrying out the preferred form of my invention as applied to a variable speed drive of the reversely axially movable conical pulley type in which a radially varied wedge shaped belt drivingly transmits rotation from one to another pair of pulleys, I provide torque responsive yieldable torque transmission, or rotation termination, or drive discontinuance means between these and one of the main shafts, and I provide such torque responsive torque and rotation termination means in co-operative relation to and co-operable with torsionally yieldable continued torque or rotation transmission means, or with torque responsive speed variation means, and I provide various other features of improvement, all of which will be hereinafter more fully set forth with reference to the accompanying drawing, in which—

Fig. 1 is a fragmentary vertical axial section of a variable speed device in which manually axially adjustable cone pulleys and a wedge shaped belt comprise the variable speed element, showing a simple form of my invention in which the variable speed element is torsionally uncouplable from the driven shaft upon overload of the latter;

Fig. 2 is a fragmentary vertical cross-section thereof cut approximately on the line 2—2 of Fig. 1 and looking in the direction of the arrows;

Fig. 4 is a view similar to Fig. 1, but showing a more complete utilization of my improvements in which in addition a torque responsively axially operable variable speed element is torsionally varied to vary the speed ratio with such variations in torque as may occur during normal torque load and before it is drivingly disconnected by my torque responsive torque and rotation termination means and upon overload;

Fig. 5 is a fragmentary vertical cross-section thereof cut approximately on the line 5—5 in Fig. 4 and looking in the direction of the arrows;

Fig. 3 is a fragmentary vertical cross-section of Figs. 1 and 4 showing the torque responsive clutch means therein in end elevation, the view being cut approximately on the plane of the lines 3—3 in said figures and looking in the direction of the arrows, and Fig. 6 is a fragmentary vertical axial section of a pair of torsionally axially variable conical pulleys showing a modified form of a yieldable continued torque and rotation transmission torque responsive axially variable drive connection between them and their shaft.

Referring to Figs. 1, 2, and 3 of the drawing, let

A indicate the frame or outer casing of a speed reducer or a variable speed device, B and S2 its main shafts, and M a variable speed element between and in operative relation to its main shafts and operable to transmit rotation from one to the other at variable speed ratios.

These parts may be of any usual or suitable construction for varying and transmitting rotary motion.

The casing A is shown as an annular casting $a$ closed at one end by a cover $b$ enclosing a speed variation chamber $e$, and at the other end by a cover $d$ enclosing a gear chamber $f$.

The main shafts are shown as radially and axially positively positioned by taper roller or other anti-frictional bearings $i$ in the covers $b$ and $d$ respectively, and either may be an input shaft and the other an output shaft of the device, but I prefer to use the shaft S2 as the drive shaft and the shaft B as the driven shaft in the construction shown.

The variable speed element M may be any suitable means between and in operative relation to the main shafts for transmitting rotation from one to the other and for varying the ratio of speed during such transmission, but I prefer to utilize tractionally driven variable speed means, preferably the well known form in which reversely axially adjustable conical pulleys radially vary a wedge shaped belt which connects and tractionally drives those of one pair from those of another pair, such as the conical pulleys N2 which rotate with and are reversely slidable axially of the shaft S2, and the conical pulleys L2 which rotate with and are reversely slidable on the shaft C2, and to utilize the shaft S2 as the drive shaft to which the pulleys N2 are drivingly connected and the shaft C2 as a driven shaft to which the pulleys L2 are drivingly connected.

The pulley shafts S2 and C2 may be any usual variable speed shafts, and the pulleys thereon may be reversely adjusted, those of one pair in opposition to those of the other pair, in any usual or suitable manner for effecting such adjustment in such variable speed device.

According to one feature of my invention, as shown in Figs. 1 and 2, I preferably positively reversely adjust the pulleys N2 by an adjuster F2 which as shown is extended through concentrically of them and has a left hand screw thread G2 in engagement with one, and a right hand screw thread H2 in engagement with the other, these screws being operable to simultaneously reversely axially move these pulleys for radially varying the engagement of a V belt M2 therewith. For this purpose, as shown, I make the shaft S2 tubular and axially fix the adjuster F2 rotatably within it, so that it may be rotated by hand or otherwise by a hand-wheel J2 externally of the groove pulley $k2$ which is keyed on the shaft S2 as a driver for rotating it, and, as shown, I slot the end of this shaft and make the pulleys N2 with screw threaded hubs in which the adjuster F2 is screwed, and with reduced spokes which slide in the slotted end of the shaft S2 and serve to key or spline the pulleys N2 thereon. By this construction the pulleys N2 can be manually axially adjusted from concentrically inwardly thereof without molesting the space at their sides for encircling them with adjustment means, and the axial stress of each is transmitted to and counter-balanced by the other, and axially resistant bearings for rotatably sustaining such stress are unnecessary, as the pair of pulleys merely have to be axially positioned by the bearings for the shaft S2.

According to another feature of improvement, as shown in the drawings, I elastically axially movably sustain the pulleys L2 by springs E2 which poise these pulleys between them and are confined between the outer sides of these pulleys and opposed shoulders on their shaft C2, so that they permit the pulleys L2 to elastically assume an axial position suited to the radial variation of the belt M2 between them incident to variations in its radial position relative to the pulleys N2, and elastically maintain the pulleys L2 in tractional engagement with the belt in whatever position they are caused to assume by the latter. The shaft C2 transmits the tension of the springs E2 across the space between the pulleys L2 so that the axial tension of the latter is transmitted from one to the other and counter-balanced between them. By this arrangement axial adjustment of the pulleys L2 may be automatically effected by the mere adjustment of the pulleys N2, and no axially resistant anti-frictional rotative bearings for resisting their axial stress are required.

According to another feature of improvement, as shown, I make the pair of pulleys L2 and the driven pulley shaft C2 rotatable together and revoluble around the axis of the pair of pulleys N2, by making this shaft tubular and mounting it rotatably on a stud shaft or axle K2 which is carried by and revolves with a revoluble carrier I², which is mounted on and drivingly connected to the shaft B, and which is revolved by the shaft C2 but at reduced speed relatively thereto, by means of a planetary gear A2 rotatable with the shaft C2 and in mesh with and revoluble around an internally toothed rack B2 fixed in the casing A and concentric of the shaft B and of suitable diameter to reduce the speed of rotation of the pulleys L2 to the speed desired for the revolution of the carrier I², whereby a different spur gear reduction of the speed of the shaft C2 may be effected in translating its rotation into revolution of the carrier I² and the shaft B, and this relative reduction will be maintained throughout variation of the speed of rotation of the shaft C2 by adjustment of the variable speed element. Preferably the rack B2 is around instead of inwardly of the planetary pinion A2, and affords a substantial speed reducer as well as a drive reversal gearing for reversing the direction of rotation of the shaft B relatively to the shaft S2.

According to another feature of improvement I provide torque responsive torque termination, rotation termination, or drive disconnection means between the variable speed element and one of the main shafts, for terminating torque or rotation transmission therebetween, or for drivingly disconnecting them upon overload of said torque responsive torque or rotation termination connection means. This may be any suitable torque responsive clutch means, but according to the preferred form of my invention, as shown, consists of a driver sleeve A' rotatable with the carrier I², one of said parts being circumferentially movable relatively to the other, and a yieldable connection or spring case C' in operative relation to them and designed to transmit a normal torque load, adjustable to drivingly connect the bushing and the carrier I² during normal torque and yieldable with excessive torque to permit the carrier to oscillate circumferentially of the bushing, to cushion torsional shocks and at a predetermined degree of such oscillation to permit the carrier to automatically disengage the drive connection between the bushing and the shaft B on which it is mounted, and thereby to permit the carrier and bushing to revolve relatively to the shaft B, to discontinue drive of the latter and relieve the variable speed element or source of power from excessive load.

This may be accomplished in any desired manner, but preferably I provide torque and rotation termination provisions as one or more semi-circular keyways $a'$ in the shaft B, and one or more reciprocal semi-cylindrical keyseats $b'$ in the hub $A'$ and mount oscillatory keys $B'$ in these keyseats, which keys preferably have semi-cylindrical outer peripheries $d'$ oscillatable into drive engagement with the keyways in one position, and have cutaway or hollow inner sides $e'$ concave to coincide with the concavity of the inner periphery of the sleeve $A'$ and oscillatable into coincidence with such periphery for drive disconnection of the sleeve and the shaft B, which keys are automatically oscillated by the oscillatory movement of the carrier $I^2$ around the sleeve $A'$, as shown by having cam provisions or projections $f'$ at the side of their axis opposite their semi-cylindrical portion and oscillatable into and out of the path of one or more operators or pins $g'$ inwardly of their axis and connected to and oscillated with the carrier $I^2$, these projections and pins being disposed to engage by torsional oscillation of the carrier $I^2$ relatively to the sleeve $A'$, and to oscillate the keys out of drive engagement with the keyways upon excessive oscillation of the carrier, whereupon the keys being neutral or passive remain in their unlocked position and permit free rotation of the carrier and the variable speed means relatively to the shaft B.

Preferably the key operators $f'$ are inwardly of their axis and the operator pins $g'$ are inwardly of such axis, so that the oscillatory motion of the operators is converted into reverse oscillatory motion of the semi-cylindrical portion of the keys, thus unlocking them by the gain of the revolving carrier $I^2$ relatively to the similarly revolving shaft B, the keyways in which then pass out of coincidence with the keyseats in the sleeve $A'$, so that the periphery of the shaft B then aids in holding the keys in their unlocked position.

Preferably the carrier $I^2$ has a central wall extension $h'$ across and spaced from the end of the shaft B, to afford a clearance for the pins $f'$ in the ends of the keys $B'$ and for the pins $g'$ carried by the carrier, and is provided with a central projection $i'$ for engaging the axial thrust bearing Z between the carrier $I^2$ and the shaft B, so that when the keys are unlocked the shaft B may anti-frictionally revolubly axially restrain the carrier $I^2$.

Preferably the yieldable connection $C'$ comprises one or more radial arms $j'$ separably screwed into the bushing $A'$, a lug or bracket $n'$ carried by the carrier $I^2$, and a compression spring $k'$ between these, which is adjustable by a nut $l'$ on a screw $m'$ by which the spring is sustained. Preferably the lugs $n'$ are duplicated at each side of the arms $j'$, and the spring $k'$ is reversible for disposing it at the other side of the arm for torsional yield when drive is in the reverse direction.

For manually engaging or disengaging drive connection between the bushing $A'$ and the shaft B my invention, as shown, provides the keys $B'$ with peripheral teeth $o'$ engaged by internal teeth $p'$ in a rotary and oscillatory ring $D'$ encircling the shaft B and the keys, and having a notch $q'$ for clearing the latter when the ring is oscillated to oscillate the keys from neutral into position for locking in either direction, which ring is preferably oscillated by a cut-out $E'$ comprising a pinion $r'$ having teeth meshing with teeth $s'$ on the ring $D'$, which pinion, as shown, is mounted on an oscillating shaft $t'$ swung from the head $d$ and operated by a handle $u'$ by which the pinion may be tilted into engagement with the ring and turned to oscillate it.

To provide for drive in either direction the pins $g'$ in the carrier $I^2$, and the pins $f'$ in the keys $B'$, are shown as removable and shiftable from a forward drive to a reverse drive position, and are shown as adjustable to adjust their relation to the drive, preferably by screwing the pins $f'$ adjustably into one or any of two threaded holes $v'$ to dispose the pins $f'$ in the path of oscillation of the pins $g'$ so that oscillation of these under excessive torque will unlock the keys and move the pins $f'$ out of the path of rotation of the pins $g'$.

As thus far described my invention provides for protection of the tractional members to manually axially variable speed change or drive reversal means and the primary source of power from injury from excessive load or torque, and preferably provides for this at the output side of the variable speed elements so that rotation of these may continue after torque disconnection of drive therefrom, but according to another feature my present invention provides torque responsive torque or rotation termination protection upon overload for the types of torsionally yieldable continued torque and rotation transmission means which are used for automatically modifying the torque within overload limits, or for automatically varying the speed during a normal torque load, for automatically modifying starting loads and reducing speed between the primary source of power and the output shaft during starting of the transmission, and for automatically accelerating such speed as the starting torque is gradually overcome, such as are used for continued torque and rotation transmission after overload for moderating the excessive maximum demand indications incident to starting loads, and for the low torque starting and gradual acceleration of transmission without terminating torque or rotation upon overload.

Any suitable means for accomplishing this may be provided, but preferably my invention accomplishes it, as shown, by designing my torque responsive torque or rotation termination means to transmit a relatively minor torque load and by cooperatively utilizing said termination means with a torque responsive yieldable continued torque and rotation transmission means designed to transmit during rotation a continued relatively major torque load between a variable speed element and one of its shafts, and accomplishes corelation between said relatively minor and major torque load means by providing adjustment means in operative relation to the yieldable connection cr, the variable speed element or the termination operable to relatively vary said torque loads as desired, in such manner that the minor torque load of said torque and rotation termination means will upon overload of the latter terminate said torque and rotation transmission, and said overloads may be relatively varied.

I preferably accomplish this as shown in Figs. 4 and 5, by making the reversely axially slidable cone pulleys $N^3$ circumferentially movable on their shaft $S^3$, and by drivingly connecting them to their shaft S3, by a yieldable connection or spring V, which as shown is compressively disposed between an arm or projection W on the adjacent pulley N3 and a bell crank X on an axially adjustable collar Y which is splined to the shaft S3 so that it rotates therewith, and serves to drive the pulley N3 from the shaft S3 through the medium of the yieldable spring V, in such manner that the pulley may rotate to the end that the shaft may rotate relatively to the pulley during yield of the yieldable connection V, and which re-acts against one arm of the bell crank X and tilts the latter with variations in torque, and the other arm thereof being revolubly connected by a keyless revoluble connection, shown as a collar and link $r$ with the hub of the pulley N3 in such manner that torque compression of the spring V will tilt the shifter X and move its connected pulley N3 outwardly upon overload and thus radially vary the belt M3 and correspondingly reduce the speed of transmission thereof. A spring V, reducer X, and driver Y is provided for each pulley N3, and these are arranged to simultaneously oppositely axially vary the opposed pulleys, and thereby to radially vary the belt therebetween, for varying the speed of its transmission to the reciprocal pulleys L2, which are shown as constructed and automatically varied as before described, and thereby automatically adapt themselves to radial variation of the belt M3 incident to automatic variation of the pulleys N3.

This permits the starting load resistance to resist rotation of the pulleys N3, which resistance compresses the springs V, and tilts the bell crank X, which separates the pulleys N3 and permits the belt M3 to enter between them to its minimum radial position therebetween, so that it will rotate the reciprocal pulleys at lowest speed, and thus reduce the stress on the shaft S3 of the starting torque by starting transmission at low speed, and as the starting torque diminishes the re-action of the springs V will gradually rotate the pulleys N3 relatively to the shaft S3 and thereby gradually accelerate speed of transmission until the torque thereof becomes normal and the pulleys of both pairs have assumed their normal drive positions, from which they may axially vary with variations in torque sufficient to more or less compress the springs V and thereby vary the speed of drive with variations in normal torque not exceeding the overload against which they will be protected by the yieldable connection C'.

Preferably the collars Y are respectively threaded on the screws G3 and H3 of the adjuster F3 as before described so that they may be adjusted toward and from each other for axially limiting axial movement of the pulleys N3 and axially sustaining these from one another throughout their automatic adjustment and in their predetermined position of maximum separation. The adjuster F3 is shown as prevented from accidental rotation in the shaft S3, as by a screw $s$ which may engage any of a series of holes $t$ in the end of the shaft.

The torque responsive connections V may be adjusted to vary their torsional yield and range of circumferential action in any suitable manner as by nuts $u$ adjustable on a screw $v$, and may be any suitable compression or tension member suitably confined between relatively movable drive and driven members. The shifter X may be any suitable means for translating torque stress into axial or other movement transversely relatively thereto, and the torsionally varied element of the variable speed element may be any axially or radially variable element thereof which may be torsionally moved relatively to any element thereof for varying the speed of transmission with variations in torque.

My torque responsive torque or rotation termination principle may be utilized with any variable speed transmission, but I prefer to utilize it in such a transmission in which one of the variable speed elements is planetary and combined with reducing gearing and with my torque responsive oscillatory clutch for drivingly disconnecting it from the shaft B, as described with reference to Figs. 1, 2, and 3, which features bear the same letters of reference in Figs. 4 and 5.

In such a combination the torque responsive speed variator is preferably designed to continuously, during transmission, transmit a normal torque load equaling or exceeding that which the termination means is designed to transmit, and to be torque responsive between limits defined by no load and the overload which would cause the automatic cutout to drivingly disconnect the variable speed element from the shaft B, within which limits the connection V yields to reduce the speed with intermediate overload and elastically restores speed with termination of intermediate overload, and thus automatically cushions torque during variations from normal torque load to a predetermined overload, and thereby reduces maximum demand indications due to starting load or momentary intermediate overloads.

In operation, with the construction shown, the character and construction of the reducing gearing being suited to the normal ratio of reduction desired between an input and an output shaft, and the character and construction of the variable speed element being suited to the desired variations of speed, the torsionally yieldable drive connection between these and the output shaft will inoperatively yield during normal torque load, and will operatively yield upon overload and thereby drivingly disconnect the output shaft from the variable speed and reducing elements in the construction shown by oscillating the semi-cylindrical side of each key B' in direction reverse to the direction of rotation of the sleeve A', in the manner before described.

Upon restoring transmission the torque responsive connection between the input shaft S3 and the variable speed element will yield and permit this shaft to rotate relatively to the pulleys N3, which will be separated by the axial shifters X, so that the belt M3 may move inwardly between them until it reaches its minimum radial position relatively to them before it begins to transmit rotation to the pulleys L2, which will be moved toward each other and move the belt to is maximum radial position relatively to them, so that the belt will rotate them at minimum speed relatively to the other pair of pulleys. Their rotation will be reduced by rolling of the planetary gear A2 in the rack B2, and the carrier I² will be revolved at reduced speed.

As the starting load diminishes and reduces the torque stress on the connection V the latter will re-act and gradually rotate the pulleys N3 toward their normal position, and thus radially progress the belt M3 toward its normal position, simultaneously increasing the speed transmitted by the variable speed element until the elements thereof have been caused to assume their normal load positions by re-action of the torque responsive connection V with diminution of torque to that of normal transmission, whereupon the connection V will maintain normal relation of the variable speed elements during normal transmission and will yield and modify such position and speed to suit variations between normal torque and overload. To provide for reversal of direction of drive the action of the torque responsive connection V and shifter X will be reversed to suit the direction of drive, and the torque responsive connection C' and its pin f' and operator g' will be shifted to suit reverse drive as before described.

To axially vary the axial relation of the pulleys of each pair, the pulleys N3 will be adjusted toward or from each other by rotating the adjuster F3 to screw in or out the drivers Y, by which the shifters X and springs V will be simultaneously moved.

My invention provides improvements which can be availed of in whole or in part and it will be understood that the invention is not limited to the particular details of construction, arrangement, relation, combination, or use, of the parts set forth and shown as constituting the preferred form thereof, since the invention may be availed of in whole or in part, according to such modifications of these as circumstances, or the judgment of those skilled in the art, may dictate, without departing from the spirit of the invention.

One such modification is shown in Fig. 6, which is a fragmentary vertical axial section of one pair of pulleys of a variable speed driver and its wedge belt and one of its shafts, showing a simpler form of a continuous torque transmission yieldable drive connection in co-operation with which use of my torque responsive torque termination means is especially advantageous for permitting extensive rotation of the shaft relative to the pulleys with variations in torque.

In this construction the left hand screw thread G4 and the right hand screw thread H4 are formed directly on the shaft S4, and the pulleys N4 are screwed on these screws and are rotatable thereon relatively to the shaft, and are drivingly connected to the latter by torsional connections V4 consisting of long coil spiral springs the outer ends of which are fastened directly to the shaft S4 and the inner ends of which are fastened directly to their adjustment pulleys N4, the arrangement being such that torque will be transmitted through the springs, which will yield and permit the belt M4 to resist rotation of the pulleys N4 during excessive starting load so that revolution of the shaft S4 will screw the pulleys N4 away from each other, which will permit the belt N4 to assume its minimum radial relation to them and thereby reduce speed of the belt to minimize the starting speed of transmission on the principle before described. As starting torque is gradually overcome, the springs V4 will correspondingly re-act and thereby cause the pulleys to screw toward each other until the parts attain their normal positions for normal transmissions torque. The length and number of coils of the springs V4 in this construction determines the number of revolutions which the shaft S4 may make relatively to the pulleys N4 before they are caused to rotate and to drive the belt M4, and the screw threads are proportioned to uniformly move the pulleys toward and from the predetermined centre line of the belt.

When this construction is used with one pair of pulleys the reciprocal pair may be adapted to variations in the belt in any manner, such for example as that hereinbefore set forth.

Although for the purpose of illustrating the preferred utilization of my present invention I have shown as the drivingly connectable and disconnectable connection between the variable speed element and the shaft B my torque operator clutch comprising a circumferentially oscillatory semi-cylindrical key B' oscillatable about an axis in the hub A' and having an oscillation provision f' oscillatable across the periphery of the shaft B and oscillated from inwardly of said periphery by a torque responsive operator g', and manually operable by a manual operator D' rotatable with it and movable relatively to it, this torque responsive clutch is not claimed in this application, but is claimed in my companion application Serial No. 610,807 filed May 12, 1932.

I claim:

1. In rotation transmissions comprising, rotary drive means, for the rotatable transmission of torque and rotary motion, rotary driven means, rotatable from and relatively to said drive means during said transmission, for the rotatable transmission of torque and rotary motion therefrom, and yieldable drive connection means in operative relation to said rotary means, for yieldably transmitting torque and rotary motion therebetween, designed to, during said transmission, yieldably transmit a relatively major torque load and variable rotary motion therebetween; the combination therewith of torque responsive torque termination means in operative relation to said yieldable drive connection means and to one of said rotary means, for transmitting torque therethrough and for terminating said transmission of torque, designed to transmit a normal torque load, being operable to transmit torque therethrough during said normal torque load, and being operable upon overload of said torque responsive torque termination means to terminate said transmission of torque and said yieldable transmission of said major torque load, and being operable to terminate said yieldable transmission of variable rotary motion upon said overload.

2. In the transmission specified in claim 1, said torque responsive torque termination means being rotatable with said yieldable drive connection means and with one of said rotary means during said normal torque load, and being operable during said rotation to rotatably transmit torque therethrough during said normal torque load and during said yieldable transmission of said major torque load and of said variable rotary motion therebetween, and being operable upon said overload to terminate said yieldable transmission of said major torque load and of said variable rotary motion.

3. In the transmission specified in claim 1, said torque responsive torque termination means being rotatable with said yieldable drive connection means and with one of said rotary means during said transmission of said normal torque load and of said major torque load and of said variable rotary motion, and being non-rotary relatively to one of said rotary means upon said overload and upon said termination of said yieldable transmission of said major torque load and of said rotary motion, and being operable upon said overload to terminate said yieldable transmission of said major torque load and of said variable rotary motion.

4. In the transmission specified in claim 1, said torque responsive torque termination means being concentric of one of said rotary means and being revoluble therewith during said transmission of said normal torque load, and being revoluble relatively thereto upon said overload and upon said termination of said yieldable transmission of said major torque load and of said variable rotary motion.

5. In the transmission specified in claim 1, said torque responsive torque termination means being in drive engagement operative relation with said yieldable drive connection means and with one of said rotary means during said transmission of said normal torque load and during said yieldable transmission of said major torque load and of said variable rotary motion, and being in drive disengagement operative relation to one thereof upon said overload, and being operable upon said overload to drivingly disengageably terminate said yieldable transmission of said major torque load and of said variable rotation.

6. In the transmission specified in claim 1, said torque responsive torque termination means being in yieldable torque responsive operative relation to said yieldable drive connection means and to one of said rotary means, and being yieldable therebetween during transmission of said normal torque load, and during said yieldable transmission of said major torque load and of said variable rotary motion, and being operable upon said overload to terminate said yieldable transmission of said major torque load and of said variable rotary motion.

7. In the transmission specified in claim 1, said torque responsive torque termination means being oscillatory, and being in oscillatory operative relation to said yieldable drive connection means and to one of said rotary means during transmission of said normal torque load and during said yieldable transmission of said major torque load and of said variable rotary motion, and being operable upon said overload to terminate said transmission of torque therebetween and said yieldable transmission of said major torque load and of said variable rotary motion.

8. In the transmission specified in claim 1, said torque responsive torque termination means being in operative relation to said yieldable drive connection means and to one of said rotary means during said normal torque load, and being manually drivingly connectable with one thereof after said overload, and being manually operable to effect said transmission of said torque and of said yieldable transmission of said major torque load and of said variable rotary motion after said termination thereof upon said overload.

9. In the rotation transmission specified in claim 1, said torque responsive torque termination means being in operative relation to said yieldable drive connection means and to one of said rotary means during said transmission of said normal torque load, and being manually disconnectable from one thereof during said transmission of said normal torque load and during said yieldable transmission of said major torque load and of said variable rotary motion, and being manually operable to terminate said yieldable transmission of said major torque load and of said variable rotary motion during said normal torque load.

10. In the rotation transmissions specified in claim 1, said torque responsive torque termination means being in operative relation to said variable drive connection means and to said driven means during said transmission of said normal torque load, and being operable to transmit said normal torque load therethrough during said transmission of said normal torque load and during said yieldable transmission of said major torque load and of said variable rotary motion, and being operable upon said overload to terminate said transmission of said torque and said yieldable transmission of said major torque load and of said variable rotary motion from said yieldable drive connection means to said driven means.

11. In rotation transmissions comprising, rotary drive means, for the rotatable transmission of torque and rotary motion, rotary driven means, rotatable from and relatively to said drive means during said transmission, for the rotatable transmission of torque and rotary motion therefrom, speed change means in operative relation to said rotary means, rotatable from said drive means and being operable to rotate said driven means therefrom, during said transmission, for transmitting said rotation at changed speed from said drive means to said driven means, and yieldable drive connection means in operative relation to one of said rotary means and to said speed change means, for yieldably transmitting torque and rotary motion therebetween, designed to during said transmission yieldably transmit a relatively major torque load and variable rotary motion therebetween; the combination therewith of torque responsive torque termination means in operative relation to one of said rotary means and to said speed change means, for transmitting and for terminating transmission of torque therethrough, designed to transmit a normal torque load, being operable during said normal torque load to transmit torque therethrough, and being operable upon overload of said torque responsive torque termination means to terminate said transmission of torque and said yieldable transmission of said major torque load and of said variable rotation, and being operable to terminate said variable transmission of rotation at changed speed upon said overload.

12. In rotation transmissions comprising, rotary drive means, for the rotatable transmission of torque and rotary motion, rotary driven means, rotatable from and relatively to said drive means during said transmission, for the rotatable transmission of torque and rotary motion therefrom, rotation reversal means in operative relation to said rotary means, rotatable from said drive means and being operable to reversely rotate said driven means therefrom, during said transmission, for reversely transmitting said rotation from said drive means to said driven means, and yieldable drive connection means in operative relation to one of said rotary means and to said rotation reversal means, for yieldably transmitting torque and rotary motion therebetween, designed to during said transmission yieldably transmit a relatively major torque load and variable rotary motion therebetween; the combination therewith of torque responsive torque termination means in operative relation to one of said rotary means and to said rotation reversal means, for transmitting and for terminating transmission of torque therethrough, designed to transmit a normal torque load, being operable during said normal torque load to transmit torque therethrough, and being operable upon overload of said torque responsive torque termination means to terminate said transmission of torque and said yieldable transmission of major torque load and of said variable rotation, and being operable to terminate said variable transmission of reversal rotation upon said overload.

13. In rotation transmissions comprising, rotary drive means, for the rotatable transmission of torque and rotary motion, rotary driven means, rotatable from and relatively to said drive means during said transmission, for the rotatable transmission of torque and rotary motion therefrom, rotation reduction means in operative relation to said rotary means, rotatable from said drive means and being operable to rotate said driven means at reduced speed therefrom, during said transmission, for transmitting said rotation at reduced speed from said drive means to said driven means, and yieldable drive connection means in operative relation to one of said rotary means and to said rotation reduction means, for yieldably transmitting torque and rotary motion therebetween, designed to during said transmission yieldably transmit a relatively major torque load and variable rotary motion therebetween; the combination therewith of torque responsive torque termination means in operative relation to one of said rotary means and to said rotation reduction means, for transmitting and for terminating transmission of torque therethrough, designed to transmit a normal torque load, being operable during said normal load to transmit torque therethrough, and being operable upon overload of said torque responsive torque termination means to terminate said transmission of torque and said yieldable transmission of said major torque load and of said variable rotation, and being operable to terminate said variable rotation reduction transmission of rotary motion upon said overload.

14. In rotation transmissions comprising, rotary drive means, for the rotatable transmission of torque and rotary motion, rotary driven means, rotatable from and relatively to said drive means during said transmission, for the rotatable transmission of torque and rotary motion therefrom, variable speed means in operative relation to said rotary means, rotatable from said drive means and being operable to rotate said driven means at variable speed therefrom, during said transmission, for transmitting said rotation at variable speed from said drive means to said driven means, and yieldable drive connection means in operative relation to one of said rotary means and to said variable speed means, for yieldably transmitting torque and rotary motion therebetween, designed to during said transmission yieldably transmit a relatively major torque load and variable rotary motion therebetween; the combination therewith of torque responsive torque termination means in operative relation to one of said rotary means and to said variable speed means, for transmitting and for terminating transmission of torque therethrough, designed to transmit a normal torque load, being operable during said normal torque load to transmit torque therethrough, and being operable upon overload of said torque responsive torque termination means to terminate said transmission of said torque and said variable transmission of said major torque load and of said variable rotation, and being operable to terminate said variable transmission of variable speed rotation upon said overload.

15. In rotation transmissions comprising, rotary drive means, for the rotatable transmission of torque and rotary motion, rotary driven means, rotatable from and relatively to said drive means during said transmission, for the rotatable transmission of torque and rotary motion therefrom, and axially operable speed change means in operative relation to said rotary means, rotatable from said drive means and being operable to rotate said driven means at changed speed therefrom, during said transmission, and axially operable for controlling said transmission of changed speed therebetween; the combination therewith of torque responsive torque termination means in operative relation to one of said rotary means and to said axially operable speed change means, for transmitting and for terminating transmission of torque therethrough, designed to transmit a normal torque load, being operable to transmit torque therethrough during said normal torque load, and being operable upon overload of said torque responsive torque termination means to terminate transmission of said torque through and said axial operation of said speed change means, and being operable to terminate said transmission of rotation at changed speed on said overload.

16. In rotation transmissions comprising, rotary drive means, for the rotatable transmission of torque and rotary motion, rotary driven means, rotatable from and relatively to said drive means during said transmission, for the rotatable transmission of torque and rotary motion therefrom, ratio variation means in operative relation to said rotary means, rotatable from said driven means and being operable to rotate said driven means therefrom, during said transmission, for transmitting said rotation from said drive means to said driven means and for varying the ratio of said transmission, during said transmission, and torque responsive drive connection means in operative relation to one of said rotary means and to said ratio variation means, for variably transmitting torque and rotary motion therebetween, designed to during said transmission variably transmit a relatively major torque load and variable rotary motion therebetween, and variably responsive to variation in said torque load, for varying said variable transmission with said variation in said load; the combination therewith of torque responsive torque termination means in operative relation to one of said rotary means and to said torque responsive means, for transmitting and for terminating transmission of torque therethrough, designed to transmit a normal torque load, being operable during normal torque load to transmit torque therethrough, and being operable upon overload of said torque responsive torque termination means to terminate said transmission of torque and said transmission of said major torque load and of said variable rotation, and being operable to terminate said variable transmission of variable rotation upon said overload.

17. In rotation transmissions comprising, rotary drive means, for the rotatable transmission of torque and rotary motion, rotary driven means, rotatable from and relatively to said drive means during said transmission, for the rotatable transmission of torque and rotary motion therefrom, ratio variation means in operative relation to said rotary means, rotatable from said drive means and being operable to rotate said driven means therefrom, during said transmission, for transmitting said rotation at variable ratio from said drive means to said driven means, torque responsively yieldable drive connection means in operative relation to one of said rotary means and to said ratio variation means, for yieldably transmitting torque and rotary motion therebetween, designed to during said transmission to yieldably transmit a variable torque load therebetween and to torque responsively vary said ratio with variations in said torque load, and drive connection means between one of said rotary means and said ratio variation means, for effecting said transmission; the combination therewith of revoluble connection means between and in operative relation to said ratio variation means and said yieldable connection means, for revolubly and relatively movably connecting one thereof with the other thereof, being revolubly operable to revolubly connect said ratio variation means with said yieldable connection means throughout said ratio variation, and being operable to revolubly permit said ratio variation of said ratio variation means coincidently with said torque responsive yield of said yieldable connection means, and being operable to revolubly permit said torque responsive ratio variation thereby during said transmission of variable rotation.

18. In rotation transmission comprising, rotary drive means, for the rotatable transmission of torque and rotary motion, rotary driven means, rotatable from and relatively to said drive means during said transmission, for the rotatable transmission of torque and rotary motion therefrom, torque responsive ratio variation means in operative relation to said rotary means, rotatable from said drive means and being operable to rotate said driven means therefrom, during said transmission, for transmitting said rotation at variable ratio from said drive means to said driven means, designed to transmit a relatively major torque load therethrough and to vary said ratio with variations in said torque load, and drive connection means in operative relation to said ratio variation means and to said rotary means, respectively, for effecting said transmission; the combination therewith of torque responsive torque termination means in operative relation to one of said rotary means and to said ratio variation means, for transmitting and for terminating transmission of torque therethrough, designed to transmit a normal torque load minor to said major torque load, being operable during said normal torque load to transmit torque therethrough, and being operable upon overload of said torque responsive torque termination means to terminate said transmission of torque therethrough and said transmission of said major torque load and said ratio variation of said rotary motion, and being operable to terminate said ratio variation transmission upon said overload.

19. In rotation transmissions comprising, rotary drive means, for the rotatable transmission of torque and rotary motion, rotary driven means, rotatable from and relatively to said drive means during said transmission, for the rotatable transmission of torque and rotary motion therefrom, and axially operable ratio variation means in operative relation to said rotary means, rotatable from said drive means and being operable to rotate said driven means therefrom, during said transmission, for the rotatable transmission of torque and of rotation at variable ratio therebetween, and axially operable for varying said ratio; the combination therewith of torque responsive torque and rotation termination means in operative relation to one of said rotary means and to said axially operable ratio variation means, for transmitting and for terminating transmission of torque and rotation therethrough, designed to transmit a normal torque load, being operable during said normal torque load to transmit said torque and said rotary motion therethrough, and being operable upon overload to terminate said transmission of said torque and of said rotary motion, and being operable to terminate said rotation at variable ratio upon said overload.

20. A rotary transmission for varying and transmitting rotary motion, comprising a rotary drive means, rotary driven means rotatable therefrom, variable speed means comprising relatively revoluble shafts, axially variable conical pulleys carried thereby respectively and wedge shaped belt means between and in operative relation to said pulleys, said pulleys being relatively axially variable and being thereby operable to radially vary tractional engagement of said belt therewith respectively, for varying the ratio of transmission therebetween from one to the other of said shafts, for transmitting rotation at variable speed from said drive means to said driven means, said variable speed means drivingly connectable and drivingly disconnectable with one of said rotary means for controlling said transmission, axial variation means in operative relation to one of said conical pulleys and being operable to axially vary the latter for varying said ratio, and drive connection means in operative relation to one of said rotary means and to said variable speed means, for effecting rotation of the latter with one of said rotary means; the combination therewith of torque responsive transmission termination means adapted to transmit a normal torque load in operative relation to said variable speed means and to one of said rotary means, and being operable upon overload to terminate said transmission therebetween.

GEORGE HOLT FRASER.